United States Patent

[11] 3,571,715

[72] Inventors Gene Beary
Franklin Park;
Anthony T. Heagney, Elmwood Park; Ole K. Nilssen, Bensenville, Ill.

[21] Appl. No. 784,097
[22] Filed Dec. 16, 1968
[45] Patented Mar. 23, 1971
[73] Assignee Motorola, Inc.
Franklin Park, Ill.

[54] OVERLOAD COMPENSATION FOR ANTENNA-TUNING SYSTEM
6 Claims, 4 Drawing Figs.

[52] U.S. Cl. .......... 325/362, 325/383, 325/411
[51] Int. Cl. .......... H04b 1/18
[50] Field of Search .......... 325/362, 383, 411, 415, 400, 387, 414, 457; 343/745

[56] References Cited
UNITED STATES PATENTS

| | | | |
|---|---|---|---|
| 3,133,251 | 5/1964 | Hays | 325/362 |
| 3,181,032 | 4/1965 | Myers | 317/33 |
| 3,209,358 | 9/1965 | Felsenhelo | 343/745 |
| 3,372,336 | 3/1968 | Bachman | 325/376 |

*Primary Examiner*—Robert L. Griffin
*Assistant Examiner*—Kenneth W. Weinstein
*Attorney*—Mueller & Aichele

ABSTRACT: A tank circuit for tuning the antenna of a radio receiver includes a voltage variable diode capacitor as the variable tuning element therein. In order to prevent strong RF input signals from appearing across and being rectified by the voltage variable capacitor, an attenuating circuit in the form of a shunt resistor or a capacitive voltage divider is connected across the antenna input to the tank circuit whenever the level of the RF signal exceeds a predetermined amount. This connection of the attenuating circuit across the antenna may be effected directly in response to the RF signal level itself or in response to a switch operated by the AGC signal of the receiver of which the antenna-tuning circuit is a part.

PATENTED MAR 23 1971 3,571,715

INVENTORS
GENE BEARY
ANTHONY T. HEAGNEY
OLE K. NILSSEN

BY Mueller, Aichele & Rauner
ATTYS.

OVERLOAD COMPENSATION FOR ANTENNA-TUNING SYSTEM

BACKGROUND OF THE INVENTION

The use of voltage variable capacitors in the form of reverse biased varactor diodes or Varicap capacitors has become attractive in electronically tuned radios, especially automobile radios, since the tuning can be effected from a remote location, such as the back seat of the automobile when the radio is located in the front seat area. Strong RF signals applied across the voltage variable capacitors, however, have been observed to cause changes in the capacitance thereof. It is believed that this capacitance change is due to a partial rectification of the RF signal by the capacitance diode, thereby changing the DC bias on the diode so that detuning of the circuit results. This detuning can occur to such an extent that there is a substantial degradation in the performance of the tuner to the point where the performance specifications of the receiver cannot be met, and operation of the receiver becomes difficult, if not impossible. The problem is especially severe in the antenna-tuning stage, so that it is desirable to provide some means of preventing strong RF signals from being applied across the voltage variable capacitor located in the antenna tuner.

SUMMARY OF THE INVENTION

It is an object of this invention to attenuate high level RF signals applied from the antenna to the antenna-tuning circuit.

It is an additional object of this invention to provide an overload protection circuit for a voltage variable reactance diode in an antenna-tuning circuit.

It is a further object of this invention to attenuate RF signals in excess of a predetermined magnitude across voltage variable capacitors in an antenna-tuning system.

In accordance with the preferred embodiments of this invention, an overload compensation circuit for an antenna-tuning system for tuning wave signal apparatus including a voltage variable reactance means in the tuning circuit of the antenna, comprises a normally disabled attenuating means connected across the antenna output and signal-responsive means for enabling the attenuating means in response to wave signals greater than a predetermined amount; so that the signals obtained from the antenna are attenuated to prevent excessive signals from being applied across the voltage variable reactance means in the tuning circuit for the antenna.

DETAILED DESCRIPTION

Figure 1:
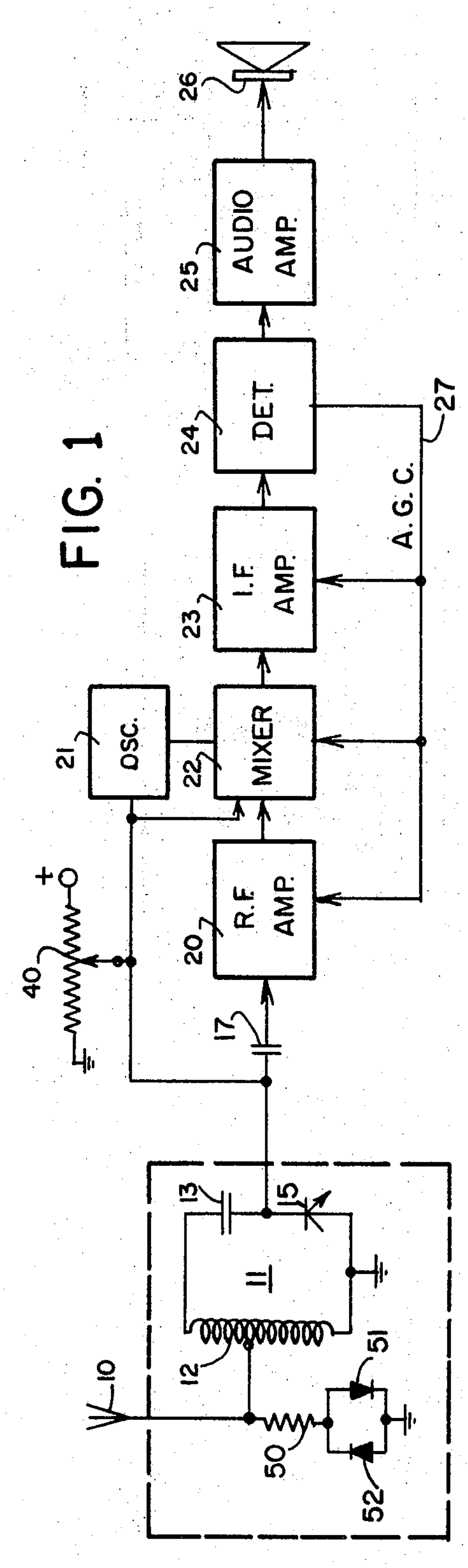
FIG. 1 is a schematic wiring diagram, partially in block form, illustrating a radio receiver having an overload protection circuit for a voltage variable capacitance tuner in accordance with a preferred embodiment of the invention.

Referring now to FIG. 1 of the drawing, there is illustrated a radio receiver, which may be an automobile radio receiver, having a signal input obtained from an antenna 10 and applied to a tuned tank circuit 11 consisting of a tapped coil 12 with a blocking capacitor 13 and a voltage variable tuning capacitor 15 connected in series across the tuning coil 12. The voltage variable capacitor 15 and the coil 12 form a tank circuit for tuning the antenna 10 through a predetermined radio frequency range.

The voltage variable capacitor 15 is a two-terminal PN junction semiconductor device which exhibits a change in capacitance proportional to a change in the direct current reverse bias across the device. Voltage variable capacitors or reactance devices are well known, and an increase in the reverse bias voltage across such a capacitor causes its capacitance to decrease, thereby increasing the capacitive reactance. A decreased reversed bias results in the opposite effect that is, the capacitance of the device increases and the capacitive reactance decreases.

The selected radio frequency signal obtained from the output of the tuning circuit or tank 11 is applied through a coupling capacitor 17 to a radio frequency amplifier 20 which amplifies the signals obtained from the antenna 10. These amplified signals then are heterodyned in a converter comprising a local oscillator 21 and a mixer 22. The resultant intermediate frequency signals obtained from the output of the mixer 22 are amplified in an IF amplifier 23 and are detected in a detector stage 24, which supplies the signals to an audio amplifier 25, which in turn drives a speaker 26. An automatic gain control signal is obtained from the detector stage 24 in a conventional manner and is applied over a lead 27 to provide automatic gain control for the RF amplifier 20, the mixer 22 and the IF amplifier 23.

In addition to using a voltage variable capacitor device for tuning the antenna system, the radio receiver shown in FIG. 1 also utilizes similar voltage variable tuning devices (not shown) for tuning the other tuned circuits in the receiver, such as the oscillator 21. These voltage variable capacitor devices for tuning provide a number of advantages over conventional mechanical tuners such as cost, size and reliability. The tuning devices in the various parts of the circuit are gang-tuned by the output obtained from a potentiometer 40 which may be located in the radio receiver itself or at a remote location. The potentiometer 40 provides a direct-current potential of varying amounts for tuning the voltage variable capacitors in the receiver, and the voltage applied from the tap of the potentiometer 40 to the junction between the voltage variable capacitor 15 and the capacitors 13 and 17 operates to tune the antenna system of the radio receiver to the desired radio frequency.

For RF wave signals obtained from the antenna 10 falling within a signal level which is below a predetermined magnitude or amount, the circuit described thus far operates satisfactorily. It has been discovered, however, that as the signal level of the signals obtained from the antenna 10 increases, a point is reached in which serious degradation of the tuning of the antenna portion of the receiver takes place. This is believed due to the fact that since the voltage variable capacitor 15 is a diode device, high level ! RF signals (those tending to overcome the reverse bias on the capacitor 15) tend to become rectified by the voltage variable capacitor 15, resulting in a change in its capacitance and a change in the biasing voltage due to the rectification action of the voltage variable capacitor device. Thus, for RF input wave signals having a voltage of sufficient magnitude to cause this rectification, serious detuning of the tank circuit 11 takes place.

In order to prevent or substantially reduce the detuning of the tank circuit 11 in response to high level RF signals applied from the antenna 10 to the tank circuit 11, a shunt resistance 50 connected in series with a parallel connected pair of oppositely poled diodes 51 and 52 is provided between the junction of the antenna 10 with the tap on the coil 12 and ground. During low level RF signal inputs to the tank circuit 11, the forward breakdown voltages of the diodes 51 and 52 are not exceeded; and the circuit including the resistor 50 appears as an open circuit and has no affect on the operation of the remainder of the receiver shown in FIG. 1. When the voltage of the RF signal obtained from the antenna 10 and applied to the tank circuit 11, however, exceeds the forward breakdown voltage of the diodes 51 and 52, the diodes commence conduction and conduct current through the resistor 50 to ground, thereby shunting part of the output of the antenna 10 to ground. This operation acts to load down or attenuate high level signals from the antenna 10 before they are applied to the tuned circuit 11 and thereby limits the level of the RF signals appearing across the voltage variable capacitor 15. As a consequence, no degradation of the signal performance occurs since the RF signals applied across the voltage variable capacitor 15 are limited by the resistor 50 to an amount below the point at which the capacitor 15 rectifies the signals.

It should be noted that the level at which shunting of the signals obtained from the antenna 10 occurs is established by the forward breakdown potential of the diodes 51 and 52. If higher potentials for the switching level for shunting RF signals through the resistor 50 is desired, it merely is necessary to connect more than one of the diodes 51 and 52 in series in each direction, with the breakdown or switching level of the circuit being increased in an amount equal to the forward breakdown potential of each of the added diodes in the series connection.

Figure 2:
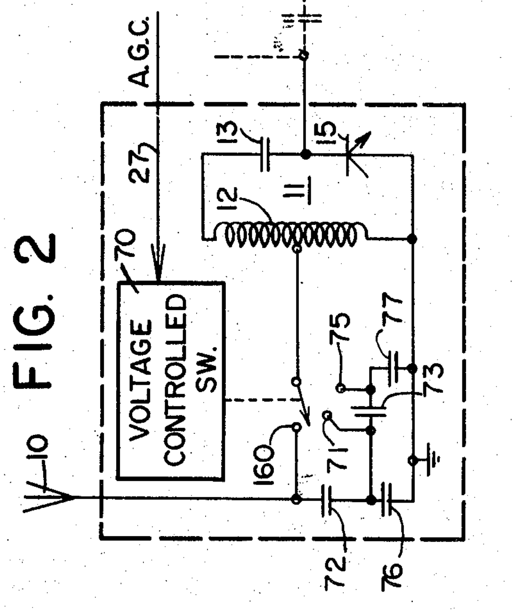
FIG. 2 is a partial schematic wiring diagram illustrating a second embodiment of the circuit of FIG. 1.

Referring now to FIG. 2 there is shown another embodiment of the overload protection or compensation portion of the circuit enclosed in the dotted line in FIG. 1 which can be substituted for that portion. In the embodiment shown in FIG. 2, the tank circuit 11 is supplied with signals from the antenna 10 through a normally closed switch contact 60 to provide signals to the remainder of the radio receiver circuit in the manner described previously. Whenever the signals as detected by the detector 24 exceed a predetermined amount, the AGC control voltage on the lead 27 is supplied to a voltage controlled switch 70 (which may be of any suitable type) which responds thereto to open the contact 60 and close a contact 71 to connect to a different point on a capacitive voltage divider across the antenna circuit to thereby attenuate the RF signals applied by the antenna to the tank circuit 11. It will be noted that when the voltage-controlled switch is in a position to close the contact 71, there no longer is a direct connection between the antenna 10 and the coil 12 of the tank circuit 11 but rather a capacitor 72, shunted by a capacitor 76, is connected in series between the antenna 10 and the coil 12 to increase the impedance loading the antenna 10. The relative values of the capacitor 72 and the capacitor 76 are chosen so that an increased impedance is placed in the output circuit of the antenna 10 while maintaining the capacitance seen by the tuning circuit 11 constant to avoid detuning of the receiver. This can be accomplished by making the capacitor 76 equal in value to the antenna capacitance while causing the capacitor 72 to be considerably smaller. For example, if the antenna capacitance is 70 pf., the value of the capacitor 76 also is 70 pf., with the value of the capacitor 72 being 5 pf. to compensate for the change in series capacitance otherwise brought about by the increased loading of the antenna 10.

If the RF signals continue to increase, the increased voltage applied to the AGC line 27 once again causes the voltage-controlled switch 70 to operate to open the contact 71 and to close a contact 75. This connects another capacitor 73, shunted by a capacitor 77, in series with the capacitor 72 between the antenna 10 and the coil 12 thereby further increasing the loading of the antenna 10 while compensating for the change in series capacitance otherwise brought about by the increased loading of the antenna 10. In the example being given, the capacitor 73 is 5 pf. and the capacitor 77 is 70 pf. As the input signal levels decrease, the AGC voltage likewise decreases, reversing the foregoing sequence, until, for low level signals, the contact 60 is closed and the contacts 71 and 75 are open.

Figure 3:
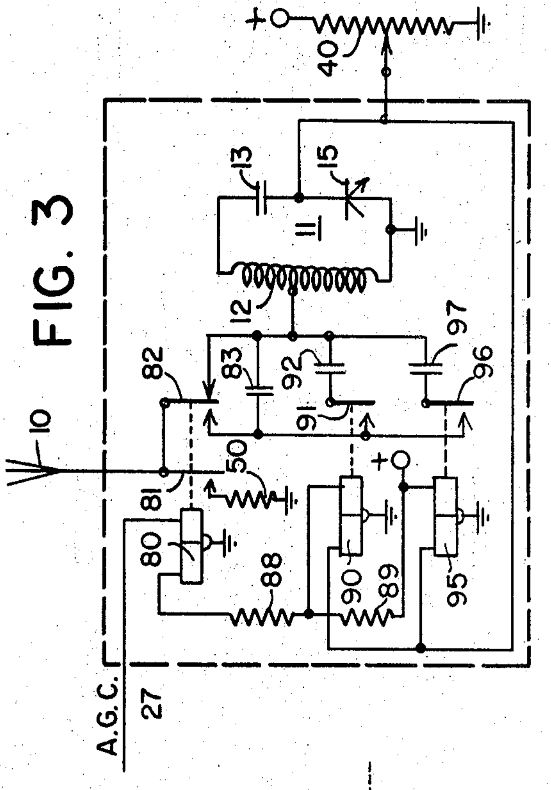
FIG. 3 is a partial schematic wiring diagram illustrating a third embodiment of the circuit of FIG. 1.

Referring now to FIG. 3 there is shown a third embodiment of the invention for providing overload protection or compensation for the voltage variable capacitor 15 in the tuning tank circuit 11. In the circuit shown in FIG. 1 whenever the resistor 50 is switched into the circuit by the rendering of the diodes 51 and 52 conductive, the added impedance loading the antenna 10 causes a slight frequency shift from the desired frequency to which the tank circuit 11 is tuned due to capacitance added to the circuit by the resistor 50. The circuit shown in FIG. 3 provides compensation for this additional capacitance.

It should be noted that the series capacitance which is added by the insertion of the shunt resistance 50 to ground varies both with the value of the resistance and the frequency to which the circuit is tuned. The relative change in the series capacitance decreases as the frequency increases, so that the compensation necessary to maintain the effective series capacitance constant becomes progressively less as the frequency increases. For increasing frequencies, the change in the series capacitance due to the insertion of the shunting impedance 50, however, is positive at all times. Therefore, by adding capacitance in series with the circuit series capacitance, the effective series capacitance may be decreased as described previously in conjunction with the embodiments shown in FIG. 2. With the other components of the circuit being constant, the exact amount of change of the series capacitance which is necessary for any frequency can be calculated; so that the addition of that particular amount of capacitance for a particular frequency then may be added to maintain the effective series capacitance constant throughout the entire operating range of the circuit whenever the resistor 50 is inserted into the circuit due to an overload or high RF current level obtained from the antenna 10.

At strong RF input signals, the AGC voltage is obtained over the lead 27 in the manner described previously and is applied to the operating winding of a relay 80 having a second biasing winding connected between ground and a source of biasing potential through a pair of dropping resistors 88 and 89. Whenever the potential applied to the operating winding of the relay 80 exceeds the potential on the biasing winding thereof, the relay 80 operates, closing the contacts 81 and 82 to their lowermost position as seen in FIG. 3. This opens the normal direct path between the antenna 10 and the tap on the coil 12 of the tank circuit 11 and connects the antenna 10 to the coil 11 through a series capacitor 83 and shunts the antenna 10 through the now closed contacts 81 and the resistor 50 to ground.

The resistor 50 provides attenuation of the signal in the same manner as described previously in conjunction with FIG. 1, but, in addition, the capacitor 83 inserted into the circuit decreases the series capacitance in order to compensate for the increase in series capacitance caused by the insertion of the resistor 50 into the circuit. This compensation however necessarily must be different for different frequencies, for the reasons stated previously, since the series capacitance change is dependent upon both the frequency of the signal and the value of the resistor 50.

In order to that the capacitive compensation remains correct over a wide frequency range, a pair of additional relays 90 and 95 are provided with operating windings connected to the tap on the potentiometer 40 which provides the tuning bias for the varactor diode 15 in the tank circuit 11. The relays 90 and 95 also are dual winding relays with a biasing winding connected to the source of biasing potential. The biasing winding of the relay 95 is connected directly to the biasing potential while the biasing winding of the relay 90 is connected to the biasing potential through the voltage dropping resistor 89. Thus, the bias on the winding of the relay 95 is somewhat higher than the bias on the winding on the relay 95; so that as the tuning voltage obtained from the potentiometer 40 is increased, the increasing voltage first causes operation of the relay 90 which closes a contact 91 to insert a capacitor 92 in parallel across the capacitor 83. This corresponds to a first predetermined increased tuning frequency which may be considered frequency $F_2$. Thus, whenever the frequency $F_2$ is tuned by the movement of the potentiometer 40, the capacitor 92 is connected in parallel across the capacitor 83. Likewise, as the tuning voltage is further increased, a point is reached where the relay 95 also operates to close a contact 96, thereby connecting a third capacitor 97 in parallel across the capacitors 83 and 92.

So long as the signal level remains below an amount sufficient to cause operation of the relay 80, these closed contacts 91 and 96 inserting the capacitors 92 and 97 in parallel with the capacitor 83 have no affect on the operation of the circuit, due to the fact that the lower contact 82 is open; so that the capacitors 83, 92 and 97 are out of the circuit between the antenna 10 and the tank circuit 11. At any time, however, that the RF signal level increases to such a point that the AGC voltage is sufficient to cause operation of the relay 80 closing the contacts 81 and 82 to their lowermost positions, the capacitors 92 and 97 in parallel with the capacitor 83 will have an affect on the circuit to adjust the effective series capacitance between the antenna 10 and the tank circuit 11. The particular combination of capacitors 83, 92, 97 used depends upon the frequency to which the circuit is tuned as determined by the setting of the tap on the potentiometer 40.

The values of the capacitors 83, 92 and 97 are chosen to reduce the effective series capacitance to its original valve even though the resistor 50 is inserted into the circuit as a shunt for overload conditions. It will be apparent that compensation may be achieved for as many different frequencies as desired, merely by adding additional relays, such as the relays 90 and 95, and setting them to close at a proper bias voltage corresponding to the frequencies at which the added compensation is desired.

The circuits shown in FIGS. 1, 2 and 3 provide an effective means for preventing degradation of performance of electronically tuned radio receivers using electronically tuned antenna tank circuits. It should be noted, however, that the compensation or overload protection circuits which have been described work equally as well with series-tuned circuits. Thus, it is possible to use electronically tuned antenna circuits employing voltage variable capacitors in the form of reverse biased varactor diodes or the like without degradation due to high RF signal levels which formerly caused such capacitors to be forward biased into a rectifying mode, so that substantially improved performance of the receiver results.

We claim:

1. In an antenna system for wave signal apparatus having an antenna with an effective series capacitance, antenna-tuning circuit means electrically connected to the antenna, said tuning circuit means including voltage variable reactance means, and circuit means connected to said voltage variable reactance means for applying a variable bias potential thereto for selectively tuning said antenna-tuning circuit means to a predetermined frequency, an overload compensation circuit including in combination:

capacitor means;

normally disabled means for connecting the capacitor means in series with the output of the antenna and the input to the tuning circuit means; and signal-responsive means responsive to wave signals greater than a predetermined magnitude for enabling the connecting means causing the capacitor means to attenuate signals applied from the antenna to the tuning circuit.

2. An antenna system according to claim 1 wherein the signal-attenuating means includes a plurality of capacitor means and wherein said connecting means operates to connect different ones of the plurality of capacitor means across the antenna in response to signals of different predetermined amounts in excess of said predetermined magnitude.

3. An antenna system according to claim 2 further including means for compensating for changes in the effective series capacitance of said antenna resulting from enabling of the signal-attenuating means.

4. In an antenna system for wave signal apparatus having an antenna, antenna-tuning circuit means electrically connected to the antenna, said tuning circuit means including voltage variable reactance means, and circuit means connected to said voltage variable reactance means for applying a variable bias potential thereto for selectively tuning said antenna-tuning circuit means to a predetermined frequency, an overload compensation circuit including in combination:

resistive means;

relay means responsive to said wave signals greater than a predetermined magnitude for closing a contact to connect the resistive means across the output of the antenna; and series capacitor means connected in series with an additional contact of the relay means between the antenna and the tuning circuit means, said additional contact being closed by the relay means in response to wave signals greater than said predetermined magnitude.

5. An antenna system according to claim 4 further including switching means connected to the circuit means for applying a variable bias potential for connecting additional capacitor means in parallel with the series capacitor means in response to predetermined bias potentials.

6. An antenna system according to claim 5 wherein the additional capacitor means includes a plurality of capacitors connected in parallel with the series capacitor means and with one another in response to progressively increasing bias potentials applied to the switching means.